(12) United States Patent
Vijayvargiya et al.

(10) Patent No.: US 11,238,158 B2
(45) Date of Patent: Feb. 1, 2022

(54) SYSTEM AND METHOD FOR AUTOMATICALLY ADJUSTING THE LEARNING MODE DURATION ON A VIRTUAL COMPUTING INSTANCE FOR AN APPLICATION SECURITY SYSTEM BASED ON ITS WORKLOAD ACTIVITIES

(71) Applicant: VMWARE, INC., Palo Alto, CA (US)

(72) Inventors: Shirish Vijayvargiya, Pune (IN); Sunil Hasbe, Pune (IN)

(73) Assignee: VMWARE, INC., Palo Alto, CA (US)

( * ) Notice: Subject to any disclaimer, the term of this patent is extended or adjusted under 35 U.S.C. 154(b) by 344 days.

(21) Appl. No.: 16/558,341

(22) Filed: Sep. 3, 2019

(65) Prior Publication Data

US 2021/0019414 A1  Jan. 21, 2021

(30) Foreign Application Priority Data

Jul. 19, 2019  (IN) .............................. 201941029203

(51) Int. Cl.
| | |
|---|---|
| *H04L 29/06* | (2006.01) |
| *G06F 21/57* | (2013.01) |
| *G06F 21/56* | (2013.01) |
| *G06F 9/455* | (2018.01) |
| *G06F 21/55* | (2013.01) |

(52) U.S. Cl.
CPC .......... *G06F 21/57* (2013.01); *G06F 9/45558* (2013.01); *G06F 21/554* (2013.01); *G06F 21/566* (2013.01); *G06F 2009/45587* (2013.01); *G06F 2009/45591* (2013.01)

(58) Field of Classification Search
CPC .... G06F 21/554; G06F 16/285; G06F 21/552; G06F 21/57; G06F 9/45558
See application file for complete search history.

(56) References Cited

U.S. PATENT DOCUMENTS

| | | | | |
|---|---|---|---|---|
| 8,402,543 | B1 * | 3/2013 | Ranjan | ................ H04L 63/1416 |
| | | | | 726/23 |
| 9,769,195 | B1 * | 9/2017 | Watson | ............... H04L 63/1441 |
| 2009/0178139 | A1 * | 7/2009 | Stute | .................... G06Q 10/109 |
| | | | | 726/22 |

* cited by examiner

*Primary Examiner* — Jason K Gee
(74) *Attorney, Agent, or Firm* — Loza & Loza, LLP

(57) ABSTRACT

A system and method for automatically adjusting a learning mode duration on a virtual computing instance for an application security system extends a minimum duration of time for the learning mode duration for a guest agent running in the virtual computing instance based on a condition with respect to suspicious activities and deviations from normal behaviors detected during a fixed time interval. The guest agent is switched to a protected mode when the condition with respect to the suspicious activities and the deviations from the normal behaviors is satisfied for any fixed time interval after the minimum duration of time.

20 Claims, 4 Drawing Sheets

SYSTEM AND METHOD FOR AUTOMATICALLY ADJUSTING THE LEARNING MODE DURATION ON A VIRTUAL COMPUTING INSTANCE FOR AN APPLICATION SECURITY SYSTEM BASED ON ITS WORKLOAD ACTIVITIES

RELATED APPLICATIONS

Benefit is claimed under 35 U.S.C. 119(a)-(d) to Foreign Application Serial No. 201941029203 filed in India entitled "SYSTEM AND METHOD FOR AUTOMATICALLY ADJUSTING THE LEARNING MODE DURATION ON A VIRTUAL COMPUTING INSTANCE FOR AN APPLICATION SECURITY SYSTEM BASED ON ITS WORKLOAD ACTIVITIES", on Jul. 19, 2019, by VMWare, Inc., which is herein incorporated in its entirety by reference for all purposes.

BACKGROUND

Applications running in a computing environment, especially those that are Internet-facing, are vulnerable to unauthorized intrusions and attacks with increasing sophistication. These unauthorized intrusions and attacks are difficult to detect because it is challenging to distinguish between application behaviors and states due to unauthorized actions with normal intended application behaviors and states.

An application security system, such as VMware AppDefense system, is able to distinguish unauthorized application behaviors and states from normal intended application behaviors and states by learning the normal intended states and behaviors for applications running on a computer system. This typically involves observing the normal intended states and behaviors of applications for a fixed duration of time, which are then used to detect unusual application behaviors and states due to unauthorized intrusions and attacks.

A concern with the fixed duration for learning normal application behaviors and states is that it is not suitable for all types of application workloads that are being executed in a computer system. For some application workloads, the fixed learning duration may be sufficient to properly learn their normal application behaviors and states. For other application workloads, the fixed learning duration may be too short to properly learn their normal application behaviors and states.

BRIEF DESCRIPTION OF THE DRAWINGS

The embodiments of the invention are illustrated by way of example, and not by way of limitation, in the figures of the accompanying drawings in which.

Throughout the description, similar reference numbers may be used to identify similar elements.

DETAILED DESCRIPTION

Figure 1:
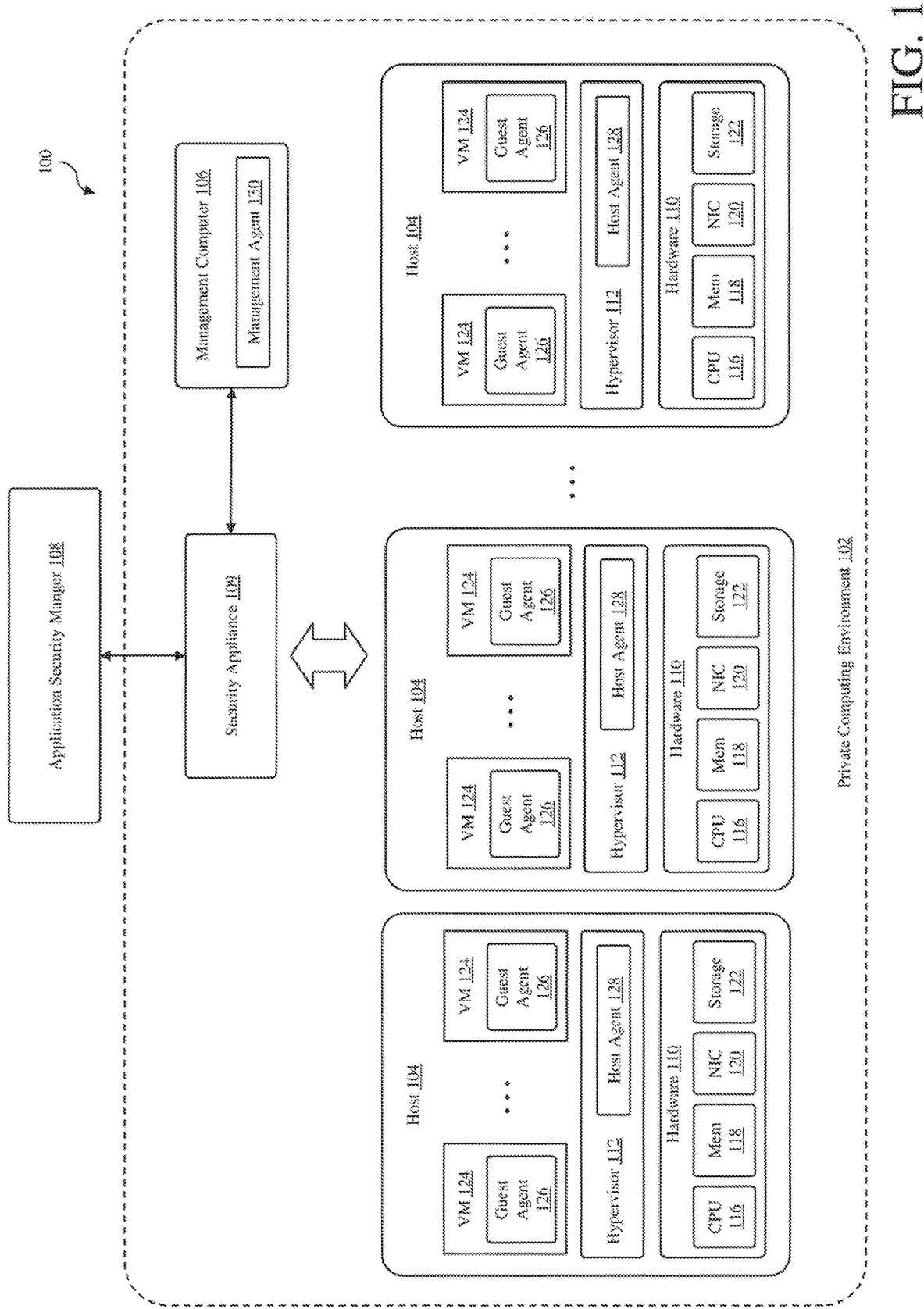
FIG. 1 is a block diagram of a computing system with application security protection in accordance with an embodiment of the invention.
Figure 2:
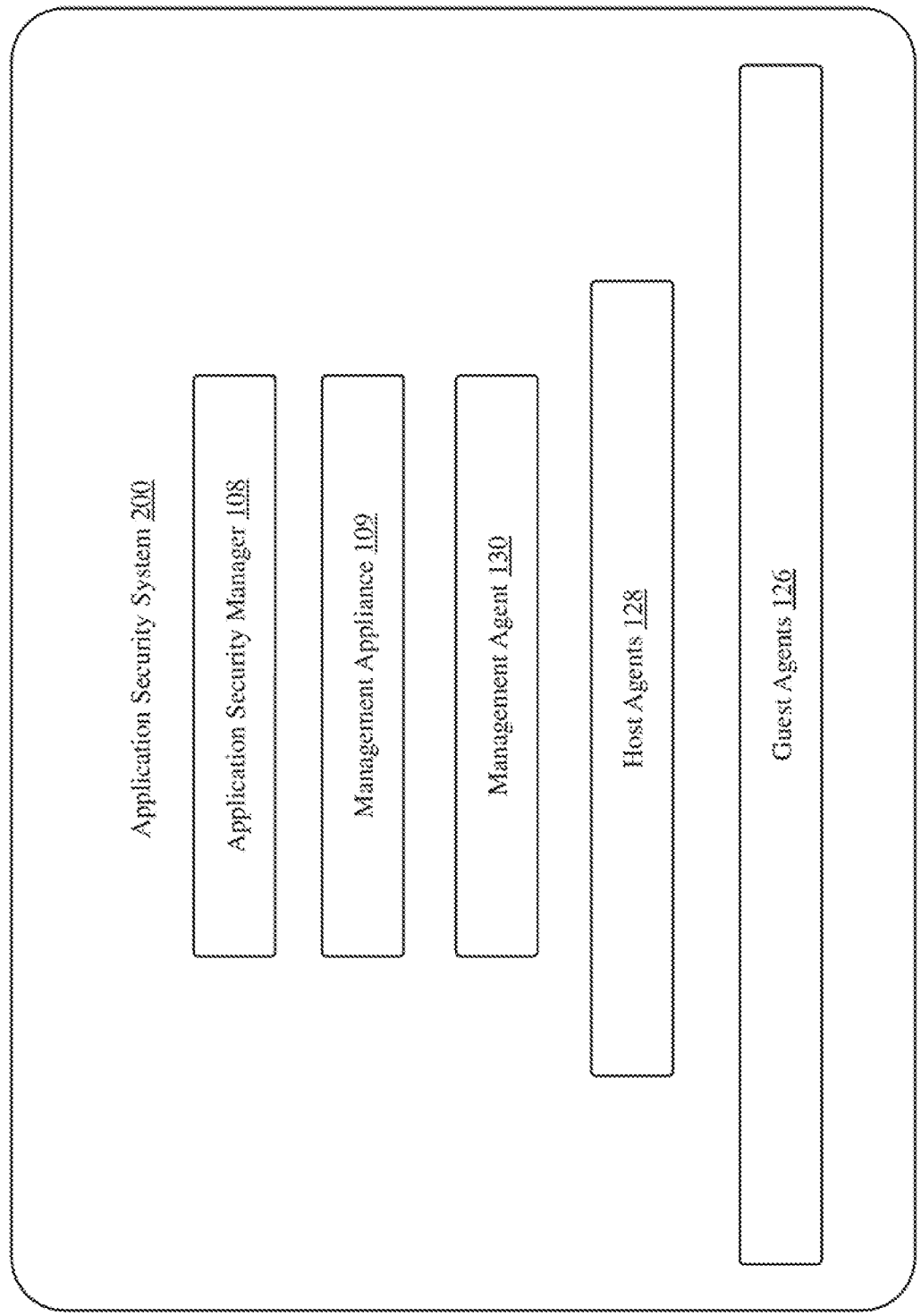
FIG. 2 is a bock diagram of an application security system included in the computing system in accordance with an embodiment of the invention.

FIG. 1 illustrates a computing system 100 with application security protection in accordance with an embodiment of the invention. As shown in FIG. 1, the computing system 100 includes a private computing environment 102, which includes a number of host computers 104 and a management computer 106. The private computing environment 102 may be a private network, such as a data center, which is defined and managed by the management computer 106. The computing system 100 further includes an application security manager 108 and a security appliance 109, which are part of an application security system 200, as illustrated in FIG. 2. The application security system 200 operates to learn the intended states and behaviors of applications running on the host computers 104 in the private computing environment 102 and then use the learnt application behaviors and states to detect unauthorized intrusions and attacks and provide security countermeasures, which may involve generating alarms, denying access to files for the compromised applications, isolating the compromised applications and/or shutting down the compromised application. As explained in below, the application security system 200 automatically adjusts the duration for learning the intended states and behaviors of applications based on the activities of the applications.

As illustrated in FIG. 1, each host computer 104 in the private computing environment 106 includes hardware 110 and a hypervisor 112. The hardware 110 of each host computer includes hardware components commonly found in a physical computer system, such as one or more processors 116, one or more system memories 118, one or more network interfaces 120 and one or more local storage devices 122. Each processor 116 can be any type of a processor, such as a central processing unit (CPU) commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network interface card. Each local storage device 122 is a nonvolatile storage, which may be, for example, a solid-state drive (SSD) or a hard disk drive (HDD).

The hypervisor 112 of each host computer 104, which is a software interface layer that, using virtualization technology, enables sharing of the hardware resources of the host computer by virtual computing instances 124 that can execute various applications. As used herein, the term "virtual computing instance" is any software entity that can run on a computer system, such as a software application, a software process, a virtual machine (VM) and a "container" that provides system-level process isolation, e.g., a Docker container. With the support of the hypervisor 112, the virtual computing instances 124 provide isolated execution spaces for guest applications to run. The virtual computing instances 124 running on the host computers 104 are shown in FIG. 1 as VMs, and will be described herein as VMs. However, the virtual computing instances 124 running on the host computers 104 can be other types of virtual computing instances.

The management computer 106 operates to manage and monitor the host computers 104. In particular, the management computer 106 is configured to monitor the current configurations of the host computers 104 and any virtual computing instances running on the host computers, for example, the VMs 124. The monitored configurations may include hardware configuration of each of the host computers 104 and software configurations of each of the host computers. The monitored configurations may also include hosting information of the virtual computing instances, i.e., which virtual computing instances (e.g., VMs) are hosted or running on which host computers 104. The monitored configurations may also include information regarding the virtual computing instances running on the different host computers 104.

In some embodiments, the management computer 106 may be a physical computer. In other embodiments, the management computer 106 may be implemented as one or more software programs running on one or more physical computers, such as the host computers 104, or running on one or more VMs 124, which may be hosted on any of the host computers. In an implementation, the management computer 106 is a VMware vCenter™ server with at least some of the features available for such a server.

The application security manager 108, which is part of the application security system 200 in the computing system 100, operates with agents running on different components of the computing system. These agents include guest agents 126 that run in each of the VMs 124 running on the different host computers 104, host agents 128 that run in each of the host computers, and a management agent 130 that runs in the management computer 106. These agents work with the application security manager 108 to learn the intended states and normal behaviors of applications running in the VMs 124 in the different host computers 104 to detect unintended abnormal states and behaviors of the applications due to unauthorized intrusions and attacks and/or to enforce appropriate security policies or rules in response to the detected unintended abnormal states and behaviors. These agents are software programs that execute their tasks to support the operation of the application security system 200.

Each guest agent 126 running in each of the VMs 124 monitors and collects process behaviors and states in that VM. The guest agent 126 also enforces security policies rules on the VM. The collected information from each guest agent 126 in the VMs 124 in a particular host computer 104 is transmitted to the host agent 128 in that particular host computer 104, which may aggregate the collected information and send the aggregated information to the application security manager 108 via the security appliance 109. The management agent 130 in the management computer 106 provides lifecycle management for the application security system 200 and direct visibility into processes and network connections running on a given VM 124. The management agent 130 may also provide reputation information to the application security manager 108 via the security appliance 109 to ensure that certain application behaviors are trusted. In an embodiment, the management agent 130 is implemented as a plug-in in the management computer 106. The security appliance 109, which is located in the private computing environment 102, is a control point for ingress and egress of data from and to the application security manager 108. The security appliance 109 brokers connections to the management computer 106 and makes outbound connections to the application security manager 108. The security applicant 109 may implemented as hardware and/or software. The application security manager 108 may be implemented as one or more software programs running on one or more physical computers. In an embodiment, the application security manager 108 may be located in a public computing environment or a "public cloud". Thus, the application security protection service provided by the application security system 200 may be a cloud-based service. The different components of the application security system 200 are illustrated in FIG. 2.

The application security system 200 operates in two modes of operations: a learning mode of operation and a protected mode of operation. The learning mode of operation involves putting the guest agents 126 in the VMs 124 of interest in a learning mode, where the guest agents monitor application behaviors and states in the respective VMs and send the monitored application behaviors and states to the application security manager 108. The learning mode of operation is executed for a period of time. After this period, the protected mode operation is then enabled, as explained below.

Based on the learnt behaviors and states, the application security manager 108 generates security policies or rules, which are sent to the guest agents 126 in the VMs 124 so that the security policies can be enforced during the protected mode of operation. These security polices include, but not limited to, generating alarms, denying access to files, isolating applications and shutting down applications when certain abnormal application behaviors and states are detected.

The protected mode of operation involves putting the guest agents 126 in the VMs 124 of interest in a protected mode, where the guest agents continues to monitor the application behaviors and states and enforces the security policies when the monitored application behaviors and states indicate unauthorized intrusions or attacks.

In some conventional application security systems, the learning mode of a guest agent is maintained for a fixed duration, which cannot be changed by an administrator. Unfortunately, the fixed duration of the learning mode is not suitable for all VMs with different workloads. For example, a shorter duration for the learning mode may be appropriate for a VM that launches only a few processes that perform the same file accesses and/or network accesses repeatedly, e.g., a VM that runs only database processes for a database tier that access database files for requests from a web tier, and thus, only requires connectivity to the web tier. In contrast, a relatively longer duration for the learning mode may be appropriate for a VM that runs many processes and requires many different network connections.

The application security system 200 in the computing system 100 in accordance with an embodiment of the invention automatically adjusts the duration of the learning mode for a particular VM based on the workload activities of that VM, which include processes performed by applications running on the VM and the connections being made for the applications. Thus, the duration of the learning mode is customized depending on workload being performed by the VM. Consequently, the duration of the learning mode for a VM that runs only database processes for a database tier that access database files for requests from a web tier will be short. However, the duration of the learning mode for a VM that runs many processes and requires many different network connections will be significantly longer.

In an embodiment, for the learning mode operation, a guest agent 126 in a VM 124 is initially placed in the learning mode for a fixed minimum duration of time to learn or determine normal intended application behaviors and states. As an example, the fixed minimum duration of time may be one week. At the expiration of the fixed minimum duration of time, the VM 124 is monitored for a fixed time interval to see if additional duration of time for the learning mode is needed for the VM based on the workload activities of the VM. As an example, the fixed time interval may be several hours. If significant new application behaviors are detected based on a criterion, such as an intended behavior delta, the learning mode duration of the guest agent is extended.

Intended application behaviors are unique behaviors that are captured and stored in a whitelist for each VM 124 by the application security manager 108. The whitelist is used during the protected mode to determine whether a current application behavior is a normal intended application behavior for a particular VM 124. That is, if the current application behavior is an application behavior found in the whitelist, then the current application behavior is deemed to be an intended application behavior for the VM 124. However, if the current application behavior is an application behavior not found in the whitelist, then the current application behavior is deemed to be an unintended abnormal application behavior for the VM 124.

The intended behavior delta is value that reflects the difference between current monitored application behaviors and the intended application behaviors in the whitelist. If the current monitored application behaviors are the same application behaviors found in the whitelist, then the intended behavior delta is zero. If some of the current monitored application behaviors are similar but different from the application behaviors found in the whitelist, then the intended behavior delta will be greater than zero. However, if some or all of the current monitored application behaviors are much different than the application behaviors found in the whitelist, then the intended behavior delta will be significantly greater than zero. Consequently, the intended behavior delta can be seen as a measure of deviations of current monitored application behaviors from the normal intended application behaviors. Thus, if the intended behavior delta is zero or less than a threshold value for a fixed time interval, then this may indicate that the applications running on a VM 124 are behaving normally.

In an embodiment, the learning mode duration for a guest agent 126 in a VM 124 may be extended when one or more suspicious activities of the VM are detected during the fixed time interval, even when no new application behaviors are detected. Suspicious activities may be activities that have been identified as suspicious based on an empirical analysis. Suspicious activities may include gaining shell access, disabling a critical process, such as antivirus process, non-legitimate file access and non-legitimate network connection. When a condition with respect to both the monitored application behaviors and the suspicious actives, i.e., no significant amount of application behavior deviations and no suspicious activities detected, is satisfied for the fixed time interval, the guest agent 126 in the VM 124 is switched to the protected mode. Otherwise, the learning mode duration for the guest agent is extended for an additional duration of time, e.g., for additional three days. However, the learning mode duration is not extended beyond a maximum duration of time. As an example, the maximum duration of time for the learning mode may be three week. When the maximum duration of time has passed, the learning mode duration is not further extended. Instead, a notification is generated and presented to a user or administrator that the VM in question cannot not be switched to the protected mode.

In an embodiment, the minimum duration of time, the additional duration of time, the fixed time interval and the maximum duration of time may be configurable by the user or administrator by accessing the application security manager 108. Thus, users or administrators are able to modify the operation of the application security system 200 based on their private computing environments and/or their preferences and goals.

Figure 3:
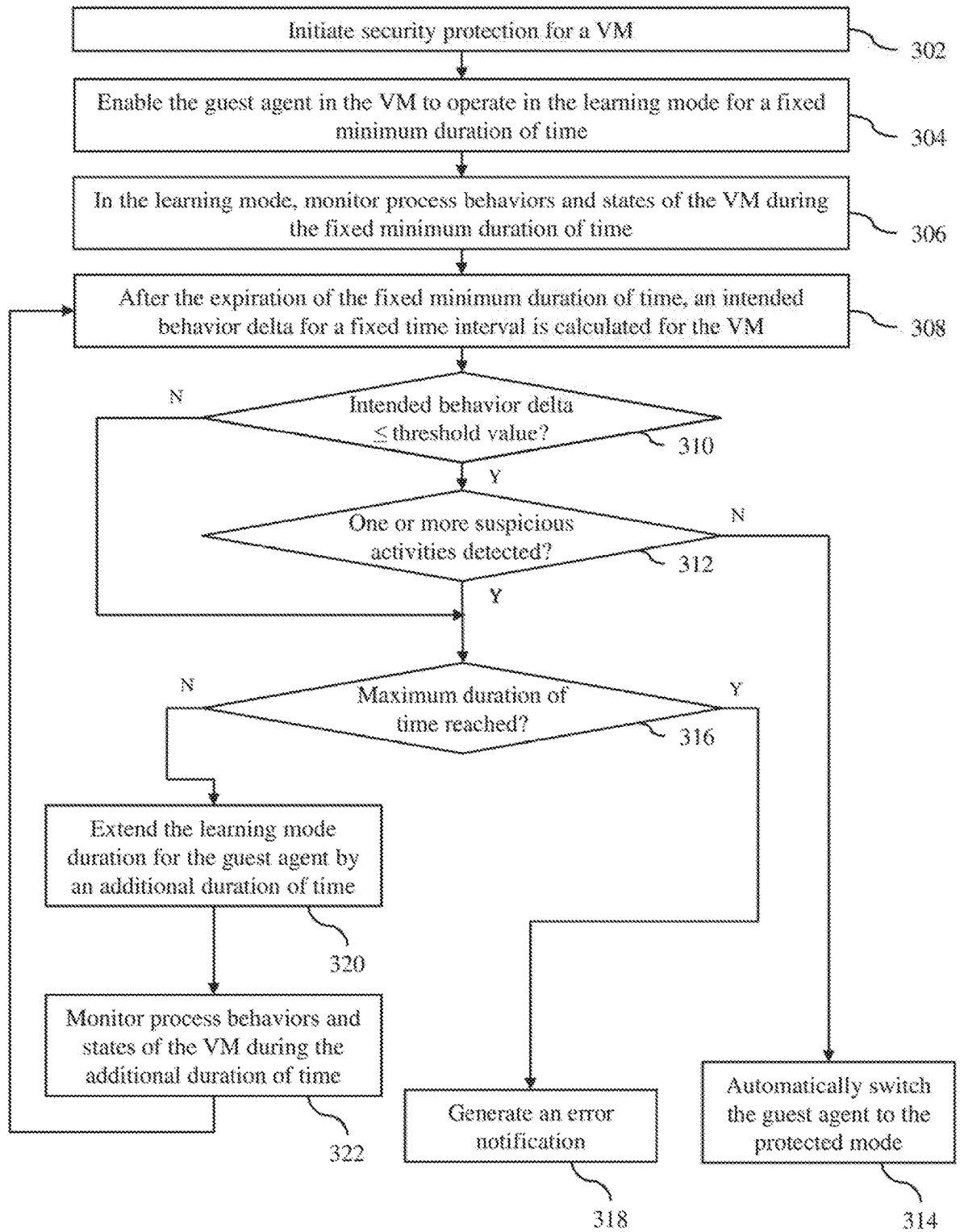
FIG. 3 is a process flow diagram of the operation of the application security system in accordance with an embodiment of the invention.

The operation of the application security system 200 in the computing system 100 in accordance with an embodiment of the invention will be described with reference to a process flow diagram of FIG. 3. At block 302, security protection for one of the VMs 124 running in one of the host computers 104 in the computing system 100 is initiated by the application security manager 108. In an embodiment, the security protection for the VM 124 may be initiated in response to user input entered using a user interface, which may be provided by the application security manager 108 via a web-based application. In another embodiment, the security protection for the VM 124 may be automatically initiated as soon as the VM is deployed or instantiated in one of the host computers 104 that is being protected by the application security system 200.

Next, at block 304, the guest agent 126 in the VM 124 is enabled to operate in the learning mode by the application security manager 108 for a fixed minimum duration of time. Next, at block 306, in the learning mode, process behaviors and states of the VM 124 are monitored by the guest agent 126 during the fixed minimum duration of time. As part of the monitoring operation executed by the guest agent 126, the process behaviors and states are sent to the application security manager 108, which uses the information to determine intended or normal behaviors of the VM 124 and populate a whitelist for the VM with the determined intended behaviors. In addition, security policies or rules may be generated by the application security manager 108 using the intended behaviors as references.

Next, at block 308, after the expiration of the fixed minimum duration of time, an intended behavior delta for a fixed time interval is calculated for the VM 124 by the application security manager 108 using the whitelist of intended behaviors. In embodiment, during the fixed time interval, the guest agent 126 in the VM 124 monitors current application behaviors of the VM and send the monitored behaviors to the application security manager 108, which compares the monitored behaviors with the intended behaviors in the whitelist to derive a value of the intended behavior delta.

Next, at block 310, a determination is made by the application security manager 108 whether the intended behavior delta for the fixed interval is equal to or less than a threshold value, which may be zero or a low non-zero value. In an embodiment, a low non-zero value is used if scheduled system processes, such as cron job, antivirus on-demand scan or some maintenance work initiated by an administrator are executing. This low non-zero value can be derived empirically. If the intended behavior delta is not equal to or less than the threshold value, then the operation proceeds to block 316. However, if the intended behavior delta is equal to or less than the threshold value, then the operation proceeds to block 312, where another determination is made by the application security manager 108 whether one or more suspicious activities were detected during the fixed time interval. If one or more suspicious activities were detected, then the process proceeds to block 316. If no suspicious activities were detected, then the operation proceeds to block 314, where the guest agent 126 of the VM 124 is automatically switch to the protected mode by the application security manager 108 so that the guest agent can now monitor the VM to detect abnormal behaviors and enforce security policies based on the detected abnormal behaviors. In an alternative embodiment, a notification may be generated by the application security manager 108 that indicates that the protected mode can now be enabled for the VM so that an administrator can manually switch the VM to the protected mode, which would mean that the guest agent in the VM is switched to the protected mode.

At block 316, a determination is made by the application security manager 108 whether the maximum duration of time has been reached. If yes, then the operation proceeds to block 318, where an error notification is generated by the application security manager 108 that indicates that the VM 124 cannot be switched to the protected mode. However, if the maximum duration of time has not been reached, then the operation proceeds to block 320, where the learning mode duration for the guest agent 126 in the VM 124 is extended by an additional duration of time. In an embodiment, this additional duration of time for the learning mode duration may be a fixed duration of time so that each extension of time is the same amount of time. In other embodiments, the additional duration of time may differ depending on the number of times the learning mode duration has been extended or some other factor, such as the value of the last intended behavior delta or the number of detected suspicious activities during the last fixed time interval.

Next, at block 322, the guest agent 126 in the VM 124 continues to operate in the learning mode for the additional duration of time. When the additional duration of time has expired, the operation then proceeds to back to block 308 to determine whether the learning mode duration should be further extended. In this fashion, the guest agent 126 of the VM 124 is automatically switched from the learning mode to the protected mode somewhere between the expiration of the minimum duration of time and the expiration of the maximum duration of time, depending on the workload activities on the VM. However, if the maximum duration of time is reached for the learning mode, the learning mode duration is not further extended and an error notification is generated so that the learning mode is not extended indefinitely.

In other embodiments, this operation may be executed simultaneously for more than one VM running in a particular host computer. As an example, the operation may be applied to few selected VMs in a host computer so that the learning mode duration of each of these selected VMs is automatically adjusted based on its workload. Alternatively, the operation may be applied to all the VMs in a host computer so that the learning mode duration of each VM in the host computer is automatically adjusted based on its workload.

Figure 4:
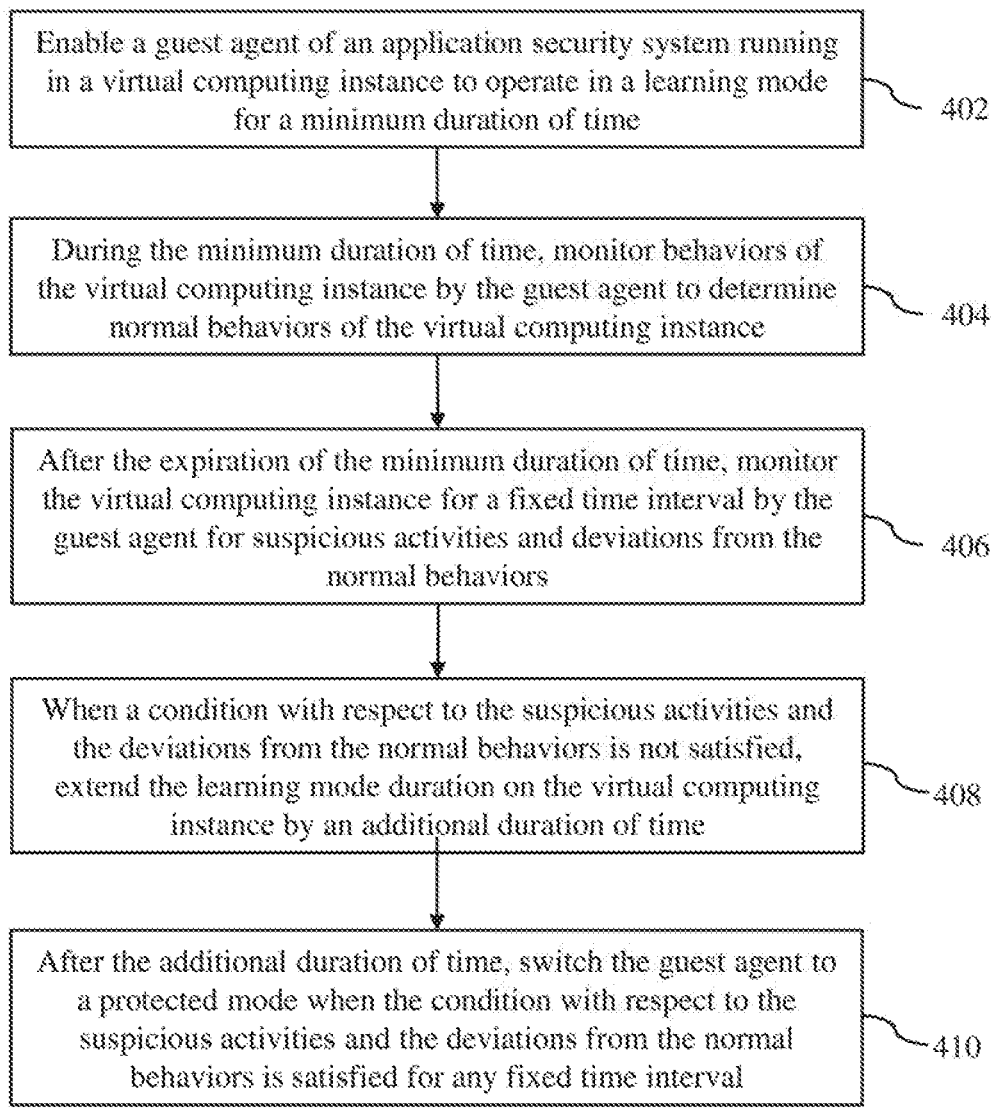
FIG. 4 is a flow diagram of a computer-implemented method for automatically adjusting a learning mode duration on a virtual computing instance for an application security system in accordance with an embodiment of the invention.

A computer-implemented method for automatically adjusting a learning mode duration on a virtual computing instance for an application security system in accordance with an embodiment of the invention is described with reference to a flow diagram of FIG. 4. At block 402, a guest agent of the application security system running in the virtual computing instance is enabled to operate in a learning mode for a minimum duration of time so that the learning mode duration is at least the minimum duration of time. At block 404, during the minimum duration of time, behaviors of the virtual computing instance are monitored by the guest agent to determine normal behaviors of the virtual computing instance. At block 406, after the expiration of the minimum duration of time, the virtual computing instance is monitored for a fixed time interval by the guest agent for suspicious activities and deviations from the normal behaviors. At block 408, when a condition with respect to the suspicious activities and the deviations from the normal behaviors is not satisfied, the learning mode duration on the virtual computing instance is extended by an additional duration of time. At block 410, after the additional duration of time, the guest agent is switched to a protected mode when the condition with respect to the suspicious activities and the deviations from the normal behaviors is satisfied for any fixed time interval.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for automatically adjusting a learning mode duration on a virtual computing instance for an application security system, the method comprising:

enabling a guest agent of an application security system running in the virtual computing instance to operate in a learning mode for a minimum duration of time so that the learning mode duration is at least the minimum duration of time;

during the minimum duration of time, monitoring behaviors of the virtual computing instance by the guest agent to determine normal behaviors of the virtual computing instance;

after the expiration of the minimum duration of time, monitoring the virtual computing instance for a fixed time interval by the guest agent for suspicious activities and deviations from the normal behaviors;

when a condition with respect to the suspicious activities and the deviations from the normal behaviors is not satisfied, extending the learning mode duration on the virtual computing instance by an additional duration of time; and after the additional duration of time, switching the guest agent to a protected mode when the condition with respect to the suspicious activities and the deviations from the normal behaviors is satisfied for any fixed time interval.

2. The method of claim 1, further comprising, after the additional duration of time, when a maximum duration of time has been reached without the guest agent being switched to the protected mode, generating a notification that the virtual computing instance cannot be switched to the protected mode.

3. The method of claim 1, further comprising calculating an intended behavior delta for the fixed time interval that corresponds to the deviations from the normal behaviors, wherein the intended behavior delta is the difference from monitored behaviors of the virtual computing instance during the fixed time interval and the normal behaviors of the virtual computing instance, wherein the normal behaviors are included in a whitelist specific to the virtual computing instance.

4. The method of claim 3, further comprising determining that the condition is not satisfied when the intended behavior delta is greater than a threshold value.

5. The method of claim 4, wherein the threshold value is zero.

6. The method of claim 1, further comprising determining that the condition is not satisfied when at least one suspicious activity is detected during the fixed time interval.

7. The method of claim 1, further comprising extending the learning mode duration on the virtual computing instance by another additional duration of time when the condition with respect to suspicious activities and deviations from the normal behaviors is not satisfied for another fixed time interval.

8. A non-transitory computer-readable storage medium containing program instructions for method for automatically adjusting a learning mode duration on a virtual computing instance for an application security system, wherein execution of the program instructions by one or more processors of a computer system causes the one or more processors to perform steps comprising:

enabling a guest agent of the application security system running in the virtual computing instance to operate in a learning mode for a minimum duration of time so that the learning mode duration is at least the minimum duration of time;

during the minimum duration of time, monitoring behaviors of the virtual computing instance by the guest agent to determine normal behaviors of the virtual computing instance;

after the expiration of the minimum duration of time, monitoring the virtual computing instance for a fixed time interval by the guest agent for suspicious activities and deviations from the normal behaviors;

when a condition with respect to the suspicious activities and the deviations from the normal behaviors is not satisfied, extending the learning mode duration on the virtual computing instance by an additional duration of time; and after the additional duration of time, switching the guest agent to a protected mode when the condition with respect to the suspicious activities and the deviations from the normal behaviors is satisfied for any fixed time interval.

9. The computer-readable storage medium of claim 8, wherein the steps further comprise, after the additional duration of time, when a maximum duration of time has been reached without the guest agent being switched to the protected mode, generating a notification that the virtual computing instance cannot be switched to the protected mode.

10. The computer-readable storage medium of claim 8, wherein the steps further comprise calculating an intended behavior delta for the fixed time interval that corresponds to the deviations from the normal behaviors, wherein the intended behavior delta is the difference from monitored behaviors of the virtual computing instance during the fixed time interval and the normal behaviors of the virtual computing instance, wherein the normal behaviors are included in a whitelist specific to the virtual computing instance.

11. The computer-readable storage medium of claim 10, wherein the steps further comprise determining that the condition is not satisfied when the intended behavior delta is greater than a threshold value.

12. The computer-readable storage medium of claim 11, wherein the threshold value is zero.

13. The computer-readable storage medium of claim 8, wherein the steps further comprise determining that the condition is not satisfied when at least one suspicious activity is detected during the fixed time interval.

14. The computer-readable storage medium of claim 8, wherein the steps further comprise extending the learning mode duration on the virtual computing instance by another additional duration of time when the condition with respect to suspicious activities and deviations from the normal behaviors is not satisfied for another fixed time interval.

15. A system comprising:

memory; and at least one processor configured to:

enable a guest agent running in a virtual computing instance to operate in a learning mode for a minimum duration of time so that a learning mode duration on the virtual computing instance is at least the minimum duration of time;

during the minimum duration of time, monitor behaviors of the virtual computing instance by the guest agent to determine normal behaviors of the virtual computing instance;

after the expiration of the minimum duration of time, monitor the virtual computing instance for a fixed time interval by the guest agent for suspicious activities and deviations from the normal behaviors;

when a condition with respect to the suspicious activities and the deviations from the normal behaviors is not satisfied, extend the learning mode duration on the virtual computing instance by an additional duration of time; and after the additional duration of time, switching the guest agent to a protected mode when the condition with respect to the suspicious activities and the deviations from the normal behaviors is satisfied for any fixed time interval.

16. The system of claim 15, wherein the at least one processor is configured to, after the additional duration of time, when a maximum duration of time has been reached without the guest agent being switched to the protected mode, generate a notification that the virtual computing instance cannot be switched to the protected mode.

17. The system of claim 15, wherein the at least one processor is configured to calculate an intended behavior delta for the fixed time interval that corresponds to the deviations from the normal behaviors, wherein the intended behavior delta is the difference from monitored behaviors of the virtual computing instance during the fixed time interval and the normal behaviors of the virtual computing instance, wherein the normal behaviors are included in a whitelist specific to the virtual computing instance.

18. The system of claim 17, wherein the at least one processor is configured to determine that the condition is not satisfied when the intended behavior delta is greater than a threshold value.

19. The system of claim 15, wherein the at least one processor is configured to determine that the condition is not satisfied when at least one suspicious activity is detected during the fixed time interval.

20. The system of claim 15, wherein the at least one processor is configured to extend the learning mode duration on the virtual computing instance by another additional duration of time when the condition with respect to suspicious activities and deviations from the normal behaviors is not satisfied for another fixed time interval.

* * * * *